Figure 1:
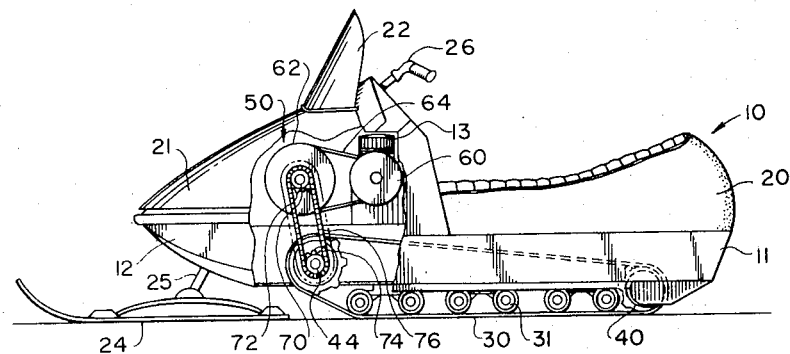

United States Patent [19]

Vadeboncoeur et al.

[11] 3,808,900

[45] May 7, 1974

[54] DRIVE SHEAVE

[75] Inventors: Leo Vadeboncoeur; Alain Tremblay, both of Quebec, Canada

[73] Assignee: Jarry Precision Limited, Laval, Quebec, Canada

[22] Filed: Jan. 8, 1973

[21] Appl. No.: 321,658

[30] Foreign Application Priority Data

Nov. 9, 1972  Canada.......................... 156,247

[52] U.S. Cl. ......................................... 74/230.17 E
[51] Int. Cl. ............................................ F16h 55/52
[58] Field of Search ............ 74/230.17 E, 230.17 A, 74/230.17 R; 287/52 R, 52.03

[56] References Cited
UNITED STATES PATENTS

| | | | |
|---|---|---|---|
| 3,394,607 | 7/1968 | Hubert | 74/230.17 E |
| 3,623,377 | 11/1971 | Lewis | 74/230.17 E |
| 3,618,415 | 11/1971 | Ruprecht | 74/230.17 M |
| 3,114,271 | 12/1963 | Davis | 287/52.03 |

Primary Examiner—Charles J. Myhre
Assistant Examiner—R. H. Lazarus
Attorney, Agent, or Firm—Larson, Taylor and Hinds

[57] ABSTRACT

In a drive sheave an improved sliding connection between the fixed assembly which is secured to the driving shaft and the slidable assembly supported to the free end of the hub portion of the fixed assembly. The region of the free end portion of the fixed hub is made of square cross-section while the hub portion of the slidable assembly is provided with an opening corresponding to the cross section of the fixed hub but of slightly larger dimensions. An anti-friction and wear resistant insert is disposed between the corresponding sliding surfaces of the two hubs and is secured to the slidable assembly so as to move therewith along the free end portion of the fixed hub. For better supporting the slidable assembly onto the fixed assembly, a ring member is provided on the hub of the fixed assembly adjacent the fixed flange for slidably engaging a correspondingly shaped bore in the center of the hub portion of the slidable assembly.

6 Claims, 9 Drawing Figures

PATENTED MAY 7 1974

3,808,900

SHEET 1 OF 3

DRIVE SHEAVE

This invention relates to drive sheaves and, in particular, to the sliding connection between the slidable assembly and the fixed assembly of drive sheaves such as used in the transmission systems of snowmobiles.

In drive sheaves, the slidable assembly which essentially comprises a pulley flange and a hub integral with the flange is supported to the hub portion of the fixed assembly in such a manner as to permit the fixed assembly which is rotated by the driving shaft to drive the slidable assembly into rotation in unison. Since, however, the sliding assembly should be permitted to effect axial displacements relative to the fixed assembly the connection between the two hubs normally comprises feather keys or splines or the like. Splines however tend to develop "flat spots" when the clutch is used in an environment of intense vibration. Accumulation of deposits in the splines also contributes to impede gradual axial displacement of the slidable assembly. The problem can be minimized by use of fine and well designed splines but then the cost of manufacture increases quite substantially.

As a result, other ways of rotating the movable assembly have been devised and used, but invariably these systems tend to greatly complicate the construction of the drive sheaves. Such systems have also been found to render the rotating drive sheaves more dangerous on account of the possiblity of small pieces or members becoming detached and flying outwardly of the sheave assembly thus endangering the safety of the operator and the bystanders.

The object of the invention is to provide an improved drive sheave of a simple design using as few components as possible and yet provide smooth shifting action with little or no hesitation upon changes in the applied torques.

A second object is to provide a snowmobile clutch wherein regular maintenance is reduced to the minimum.

Another object is to provide an improved drive sheave in which wear of contacting surfaces can be cured by replacing small inexpensive components.

In accordance with this invention an improved sheave drive is provided wherein the free end of the fixed hub is of regular polygonal cross-section having between three and five sides, preferably four sides, and in which the slidable hub comprises a central opening which corresponds to the shape of the free end of the fixed hub. A thin walled polygonal slide bearing is disposed between these sliding surfaces of the two hubs.

A supporting ring member is preferably mounted to the fixed hub adjacent the fixed pulley flange and a sliding bearing is secured to a cylindrical opening in the hub of the slidable assembly adjacent the slidable pulley flange whereby the slidable assembly is slidably supported to the fixed hub at two spaced apart regions.

Preferably, the cross-section of the free end portion of the fixed hub will be square and polished, and the bearing insert mounted to the square opening in the slidable hub is made of self-lubricating plastic material or other suitable bearing materials.

Figure 2:
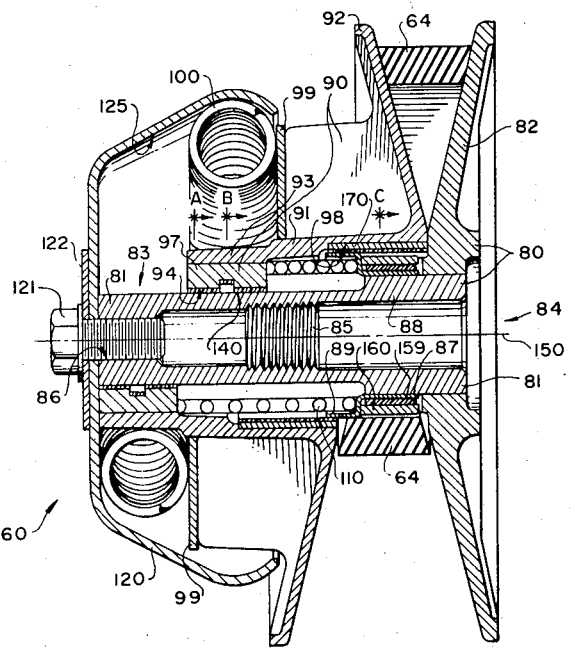
Figure 3:
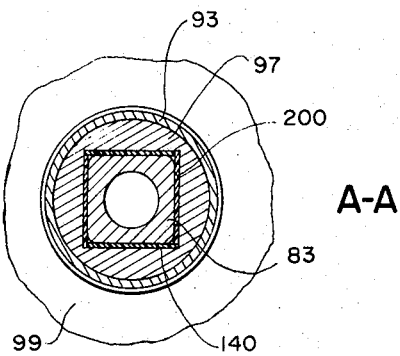
Figure 4:
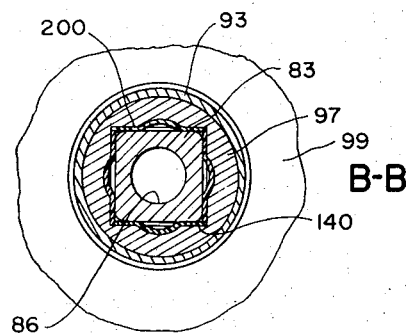
Figure 5:
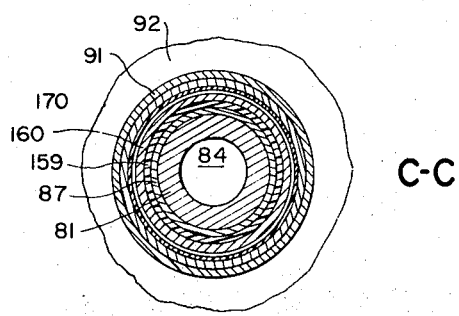
Figure 6:
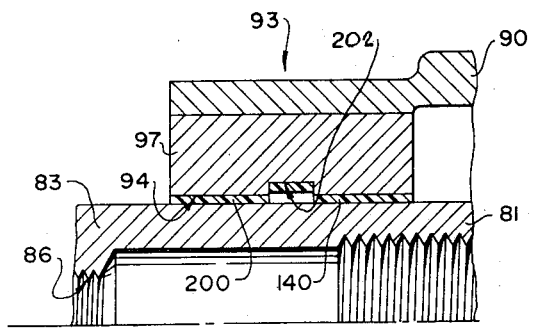
Figure 7A:
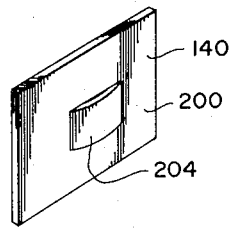
Figure 7B:
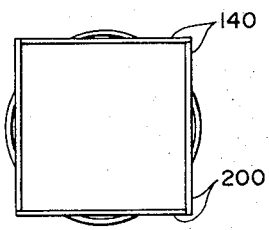
Figure 8:
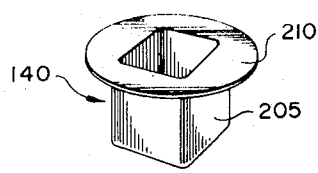

In the accompanying drawings which illustrate exemplary preferred embodiments of this invention, FIG. 1 is a side view of a conventional snowmobile showing a known power transmission arrangement, FIG. 2 is a central cross-sectional view of a drive sheave in accordance with this invention, FIG. 3 is a section taken along lines A—A in FIG. 2, FIG. 4 is a section taken along lines B—B in FIG. 2, FIG. 5 is a section taken along line C—C in FIG. 2, FIG. 6 is an enlargement of a portion of FIG. 2, FIG. 7a is a perspective view of a sliding bearing insert as used in the sheave shown in FIG. 2, FIG. 7b is an end view of a square sliding bearing, and FIG. 8 is a perspective view of a different sliding bearing.

With particular reference to FIG. 1 which illustrates in side elevational veiw a conventional snowmobile drive mechanism, the snowmobile is referred to by reference numeral 10, and comprises a body consisting of a rear tunnel 11 and a forward extension 12 onto which is mounted engine 13 and the associated transmission system 50. Over the tunnel 11 a seat 20 is provided for receiving the operator and an occasional passenger, and towards the front portion of the snowmobile, the engine is disposed within a cowling 21 which provides a windshield 22 for shielding the driver from the wind. Also at the front of the snowmobile runners 24 are indicated which are supported to the body by means of spindles 25 which are connected by means of linkages to handlebar 26 for the control of the direction of the snowmobile.

The intermediate portion of the snowmobile is supported by means of a track 30 and an associated suspension system which in the illustrated example comprises bogie wheels 31 resiliently depending from tunnel 11. The endless track 30 is entrained around rear sprocket 40 and front drive sprockets 42 in the conventional manner. For rotating drive sprockets 42 which are mounted upon a common axis 44, a suitable clutch and variable transmission system 50 interconnects the output shaft of engine 13 and drive axle 44. Transmission system 50 includes a drive pulley or driving sheave 60, a driven pulley or sheave 62 and a v-belt 64 disposed around sheaves 60 and 62. Driven pulley 62 is mounted to a suitable support which includes a countershaft 70 which carries a chain sprocket 72. Drive axle 44 also carries a chain sprocket 74, and chain sprockets 72 and 74 are interconnected to one another by means of chain 76. With this arrangement, the output shaft from engine 13 drives drive sheave 60 which in the engaged condition turns v-belt 64 to rotate driven pulley 62. Countershaft 70 which interconnects driven sheave 62 and chain sprocket 72 causes chain 76 to rotate and therefore turn chain sprocket 74 which is connected to drive axle 44 and drive sprockets 42.

This invention is concerned with an improved driving sheave construction as illustrated in greater detail in FIGS. 2 to 8. Referring now to FIG. 2 wherein the top half portion shows the sheave in 'top gear' condition while the bottom section indicates the relative position of components in 'idle' position, a drive sheave in accordance with this invention is shown comprising a fixed assembly 80 adapted for connection to the output shaft of the engine (not shown) for rotation therewith, and a slidable assembly 90 which is slidably and coaxially connected to the fixed assembly 80 for rotation in unison. Slidable assembly 90 is however mounted for relative displacement along the axis of fixed assembly 80 as will be described hereinafter in detail and it should be understood that slidable assembly 90 is not made up of two offset halves, there being shown the same elements in two different positions. The drive sheave of FIG. 2 also includes centrifugal means 100 which acts upon the slidable assembly, return spring means 110 which tends to oppose the action of centrifugal means 100, and housing means 120 for the centrifugal means 100.

The fixed assembly 80 includes a hub portion 81 which carries a fixed coaxial frusto-conical flange 82 and similarly, slidable assembly 90 comprises a hub portion 91 which is mounted coaxially around hub 81 and which also carries a flange 92 in the vicinity of flange 82. Flanges 82 and 92 define a v-shaped formation for receiving therebetween a v-belt 64 in a well-known manner. Inner hub 81 is essentially an elongated member which carries flange 82 at one end and which has a free end portion 83 spaced apart from flange 82. In the vicinity of fixed flange 82, inner hub 81 has a central bore 84 which is threaded as at 85 and bore 84 is adapted to receive the free end of the output shaft of the drive motor or engine (not shown). Free end portion 83 of elongated member 81 is of constant polygonal cross-section and comprises a central threaded bore 86 for receiving therein a retaining screw 121 which detachable secures housing means 120 to the free end 83 of elongated member 81. A washer 122 may be inserted between the head of screw 121 and housing 120 for better connection.

Hub 91 of slidable assembly 90 consists of a hollow member which is coaxially mounted onto the free end portion 83 of elongated member 81, and its free end 93 is internally shaped so as to conform essentially to the cross-section of free end 83 of inner elongated member 81. Hence, hollow member 91 comprises a longitudinal passage 94 of polygonal cross-section but whose dimensions are slightly larger than the outside dimensions of free end portion 83 of elongated member 81.

The space between free ends 83 and 93 is made sufficiently wide so as to permit the insertion of a slide bearing means 140 formed as a thin-walled insert closely fitting between the longitudinal passage 94 and the outside surface of free end 83 of elongated member 81.

Since the adjacent areas of free end portions 83 and 93 are of regular polygonal constant section, slidable assembly 90 is constrained against angular displacement relative to fixed assembly 80 but is free to slide along free end portion 83. In this manner, slidable assembly 90 is driven into rotation by fixed assembly 80 while maintaining its freedom of axial movement. The polygonal interconnection illustrated in FIGS. 3 to 8 consists of four equal sides thus defining a square shaft arrangement. The number of sides cannot of course be less than three but could exceed four although in practice, binding is more susceptible to occur as the number of faces increases and the angle between the sides and the tangent becomes more acute.

In high performance snowmobiles wherein quick and smooth shifting under high torque is very desirable, the square arrangement has been found to be a good compromise between the strength of a circular shaft and the angularity of a triangular shape.

Centrifugal means 100 consists of a garter spring which encircles the free end portion 93 of slidable assembly 90 and which applies an axial force onto thrust plate 99 as the centrifugal force causes spring 100 to move outwardly along inclined surface 125 of housing 120. Other known types of centrifugal means such as flyweights could be substituted for spring 100. Return spring 110 merely serves to urge assemblies 80 and 90 apart from one another in the well known manner.

In practice, elongated member 81 may be made of steel and flange 82 can be cast aluminum or other suitable light metal. The slidable assembly may also be made of cast aluminum and the hub portion 91 includes a steel insert 97 which defines the polygonal longitudinal passage 94.

With reference to FIGS. 2 and 5, the intermediate portion of fixed assembly 80 also includes a rigid ring member 87 press fitted onto cylindrical portion 88 of elongated member 81, and ring member 87 carries an anti-friction ring 159 and a bearing 160 for facilitating rotation of belt 64 at idle or disengaged condition as shown in the lower part of FIG. 2. The free end portion of ring 87 includes a cylindrical flange portion 89 of larger diameter, and flange 89 encircles the first few coils of spring 110. In the illustrated embodiment, the end portion of hollow member 91 adjacent fixed flange 92 comprises a cylindrical bore 98 which provides a seat for a slide bearing 170 formed as a thin-walled cylindrical insert closely fitting around the periphery of flange 89 of ring member 87. By making insert 170 sufficiently long, a sliding engagement between insert 170 and cylindrical flange 89 is maintained throughout the sliding movement of slidable assembly 90 thus making a second area of engagement between slidable assembly 90 and fixed assembly 80.

FIGS. 3, 4, 6, 7a and 7b show in greater detail the construction of the components which define the slidable interconnection of assemblies 80 and 90 at their free end portions 83 and 93. Insert 140 is shown as being made up of four rectangular pieces 200 and the free end portion 83 of elongated member 81 is of square cross-section which is a preferred embodiment of this invention. In order to retain rectangular pieces 200 against displacement longitudinally a hub 97, an interrupted circular groove 202 is machined internally of hub 97 and this provides relatively small pockets into which conforming depressions 204 in rectangular pieces 200 can be closely fitted.

Once the free end portion 83 of elongated member 81 is in position with the four inserts elements 200 in place, the insert assembly or bearing 140 acts as if it were a one-piece bushing extending around all four faces of elongated member 81. In a particular embodiment, the surface of the free end portion 83 is polished chrome finish, and bearing element 200 is made of non-lubricated bearing material having an anti-friction coating, e.g. that known under the trademark GARLOK DU, or a self-lubricating plastic-based bearing material such as GARLOK PB-312, also sold by Garlok Bearings Inc., New Jersey, U.S.A.

Alternatively, and as shown in FIG. 8, bearing 140 can take the form of a square cross-section molded element 205 made of a plastic preferably self-lubricating material for example GARLOK BP 321. Bushing 140 is provided with a radially extending shoulder or flange 210 adapted to abut against the extremity of free end portion 93 of hollow member 91.

The slide bearings of a drive sheave in accordance with this invention require practically no maintenance, and in case of excessive wear, it is relatively simple an operation to remove and replace bushings 140 and/or 160. Moreover, with the centrifugal system 100 described before which requires the minimum number of components, one obtains a safe, durable, maintenance free drive sheave which is so critical to the realibility of a snowmobile.

We claim:

1. A drive sheave comprising a fixed assembly adapted to be connected to a driving shaft for rotation therewith, a slidable assembly slidably and coaxially connected to said fixed assembly for rotation in unison and slidable relative to said fixed assembly along the axis of rotation thereof, centrifugal means acting upon said slidable assembly, return spring means acting against said centrifugal means, and housing means for said centrifugal means, each assembly comprising a hub portion carrying a coaxial frusto-conical flange, said flanges defining a v-groove for engaging a v-belt in a power transmission system, the hub portions of said fixed and slidable assemblies cooperating with one another for interconnecting said assemblies, the hub portion of said fixed assembly being an elongated member carrying said flange at one end and having a free end portion spaced from said flange, and having an inner bore at said one end for rigidly securing said fixed assembly to said driving shaft, the free end portion of said elongated member being of constant square cross-section and having a coaxial threaded bore for receiving therein a retaining screw for detachably securing said housing means to said elongated member, the hub portion of said slidable assembly consisting of a hollow member coaxially mounted onto the free end portion of said elongated member and the associated frusto-conical flange being rigidly secured to one end of said hollow member, said hollow member being disposed with its free end portion encircling the free end portion of said elongated member and the associated frusto-conical flange adjacent the flange of said elongated member, said free end portion of said hollow member comprising a longitudinal passage of square section slightly larger than the outside dimension of the free end portion of said elongated member, said drive sheave further comprising slide bearing means for said hubs, said slide bearing means being formed by a thin wall insert closely fitting between the free end portions of said elongated member and of said hollow member.

2. The drive sheave defined in claim 1 wherein said insert consists of four rectangular pieces of rigid material applied against the four inner walls of said passage for movement with said hollow member along said elongated member.

3. The drive sheave defined in claim 2 wherein the inner surface of each rectangular piece is provided with an antifriction coating.

4. The drive sheave defined in claim 3 wherein said passage comprises inner slots adapted to prevent longitudinal displacement of said rectangular pieces relative to said hollow member, each said piece comprising a depressed portion adapted to register with one of said slots.

5. The drive sheave defined in claim 1 wherein said insert consists of a cylindrical plastic sleeve of constant square cross-section with an enlarged shoulder at one end for abutting against one end of said passage.

6. The drive sheave defined in claim 1 wherein said bearing means further comprises a coaxial cylindrical shoulder on said elongated member between the free end portion and the frusto-conical flange thereof and a correspondingly dimensioned coaxial cylindrical bore in said hollow member adjacent the frusto-conical flange thereof, said shoulder closely fitting within said cylindrical bore and sliding therealong upon relative axial displacement of said assemblies.

* * * * *